(12) United States Patent
McGee

(10) Patent No.: US 7,796,836 B2
(45) Date of Patent: Sep. 14, 2010

(54) COLOR CONDENSATION FOR IMAGE TRANSFORMATION AND/OR COMPRESSION

(75) Inventor: Jeffrey Dykes McGee, San Diego, CA (US)

(73) Assignee: General Atomics, San Diego, CA (US)

( * ) Notice: Subject to any disclaimer, the term of this patent is extended or adjusted under 35 U.S.C. 154(b) by 1199 days.

(21) Appl. No.: 11/367,508

(22) Filed: Mar. 3, 2006

(65) Prior Publication Data

US 2007/0206852 A1    Sep. 6, 2007

(51) Int. Cl.
*G06K 9/36* (2006.01)
*G06K 9/46* (2006.01)

(52) U.S. Cl. .......................... 382/276; 382/232

(58) Field of Classification Search .................. 382/162, 382/166, 173, 180, 232, 240, 244, 250–251, 382/274, 276, 305, 312; 375/240.11, 240.19; 348/273, 280, 336; 341/126
See application file for complete search history.

(56) References Cited

U.S. PATENT DOCUMENTS

| | | | |
|---|---|---|---|
| 5,684,897 A | | 11/1997 | Kumagai et al. |
| 5,991,512 A | * | 11/1999 | Shaked et al. ................. 358/1.9 |
| 6,091,777 A | | 7/2000 | Guetz et al. |
| 6,154,493 A | * | 11/2000 | Acharya et al. ......... 375/240.19 |
| 6,711,299 B2 | | 3/2004 | Chao et al. |
| 6,744,919 B2 | | 6/2004 | Said |
| 6,825,876 B1 | * | 11/2004 | Easwar et al. ................ 348/234 |
| 6,832,001 B1 | | 12/2004 | Kashiwagi |
| 6,879,721 B2 | * | 4/2005 | Bradburn ..................... 382/205 |
| 7,480,417 B2 | * | 1/2009 | Malvar ........................ 382/244 |
| 2002/0064306 A1 | | 5/2002 | Pilz |
| 2002/0196970 A1 | | 12/2002 | Sano et al. |
| 2003/0002734 A1 | | 1/2003 | Islam et al. |
| 2003/0026477 A1 | | 2/2003 | Ishiga |
| 2003/0068089 A1 | | 4/2003 | Sano et al. |
| 2003/0223633 A1 | | 12/2003 | Pohjola |

* cited by examiner

*Primary Examiner*—Kanji Patel
(74) *Attorney, Agent, or Firm*—Fitch Even Tabin & Flannery

(57) ABSTRACT

The present embodiments provide methods and systems for use in transforming content, such as multimedia content. Some embodiments provide method for use in image compression. These methods receive digital image data comprising a plurality of pixel data, separate the plurality of pixel data of the digital image data according to color components, condense the pixel data of the same color component defining a plurality of condensed pixel data each corresponding with a color component, cooperate the condensed pixel data defining representative image data, and transform the representative image data.

18 Claims, 14 Drawing Sheets

620

520

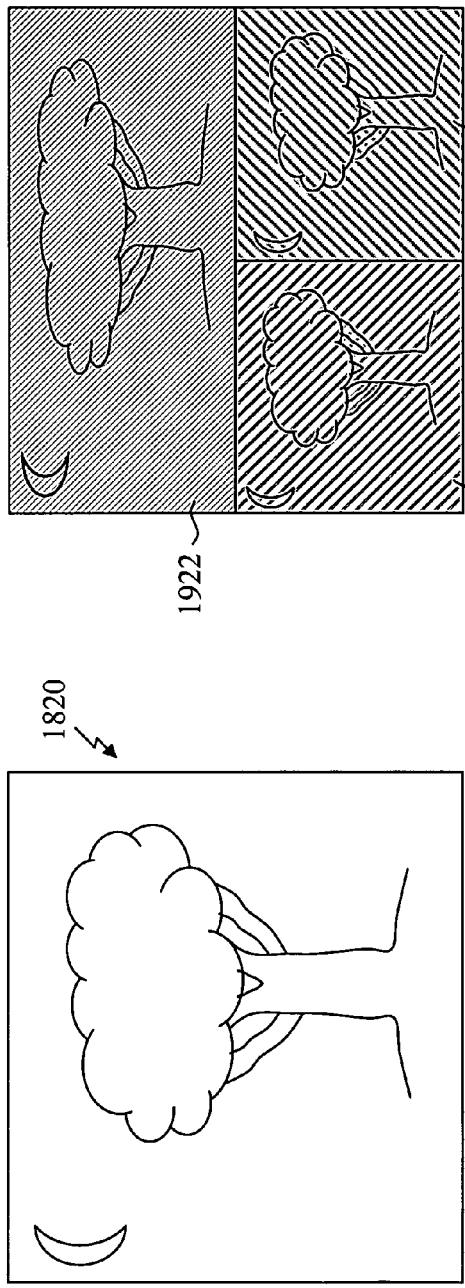
FIG. 18
FIG. 19
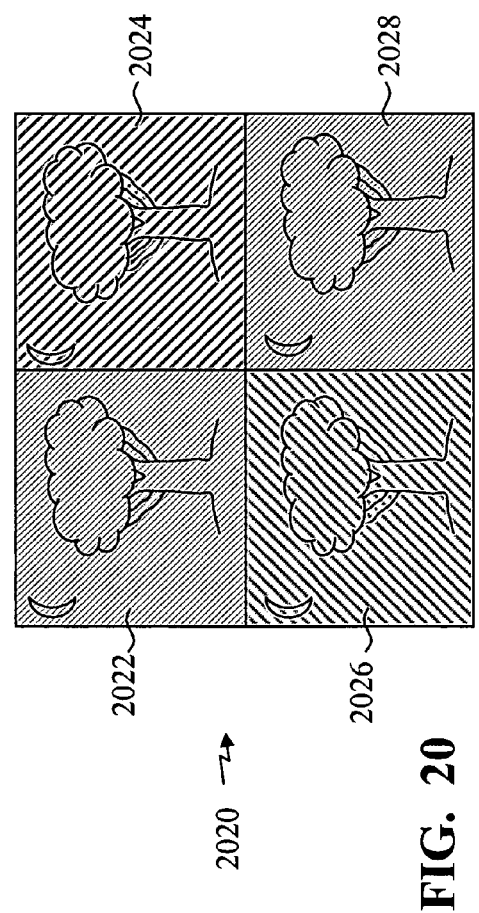
FIG. 20

US 7,796,836 B2

COLOR CONDENSATION FOR IMAGE TRANSFORMATION AND/OR COMPRESSION

FIELD OF THE APPLICATION

The present application is directed generally toward the transformation of digital data, and more particularly to processing and transformation of images, video and/or other multimedia content.

BACKGROUND

The use of digital data has increased dramatically over the last several decades. As the precision of data becomes more critical, the use of digital data continues to increase. Further, many systems convert analog data into digital data for storage, communication, accuracy and other reasoning.

Further, devices detecting and/or recording digital content continue to improve. The detected and/or recorded digital content achieved through these improved devices is typically obtained at higher rates and/or at higher resolutions. Therefore, the amount of data further continues to increase.

To allow for storage and communication of this data, systems and users often try and reduce the amount of data without adversely or only minimally degrading the quality of the data. There are many types of systems and techniques for reducing and/or compressing the digital content.

SUMMARY OF THE INVENTION

The present embodiments provide methods and systems for use in transforming content, such as multimedia content. Some embodiments provide methods for use in image compression. These methods receive digital image data comprising a plurality of pixel data, separate the plurality of pixel data of the digital image data according to color components, condense the pixel data of the same color component defining a plurality of condensed pixel data each corresponding with a color component, cooperate the condensed pixel data defining representative image data, and transform the representative image data.

Some embodiments provide methods for use in transforming digital data. The methods receive image data comprising a plurality of pixel data, reduce variations between neighboring pixel data of the plurality of pixel data producing reduced variation pixel data, define representative image data comprising the reduced variation of pixel data, and transform the representative image data.

Other embodiments provide apparatuses for use in transforming digital data. These apparatuses can include a parser that receives a plurality of pixel data representative of a digital image and separates the pixel data according to a color component, a memory coupled with the parser to receive the separated pixel data, a condenser coupled with the memory to condense the pixel data according to the color components of each pixel data producing condensed pixel data defining a condensed representation of the pixel data, and a transformer coupled with the condenser to receive the condensed pixel data and to transform the condensed pixel data.

Some embodiments provide methods for rendering image data. These embodiments receive pixel data of an image; separate the pixel data according to color components of the pixel data; rearrange the pixel data in a defined imagery format; interpolate the rearranged pixel data in the defined imagery format; and render the interpolated and rearranged pixel data.

A better understanding of the features and advantages of the present embodiments will be obtained by reference to the following detailed description and accompanying drawings which set forth illustrative embodiments in which the principles of the embodiments are utilized.

BRIEF DESCRIPTION OF THE DRAWINGS

The aspects, features and advantages of the present embodiments will be more apparent from the following more particular description thereof, presented in conjunction with the following drawings wherein:

FIG. 18 depicts a simplified block diagram representation of an image;

FIG. 19 depicts a simplified block diagram representation of a reproduction of representative image based on the condensed pixel data;

FIG. 20 depicts a simplified block diagram representation of an alternate reproduction of representative image of image of FIG. 18 based on color condensed pixel data;

Figure 1:
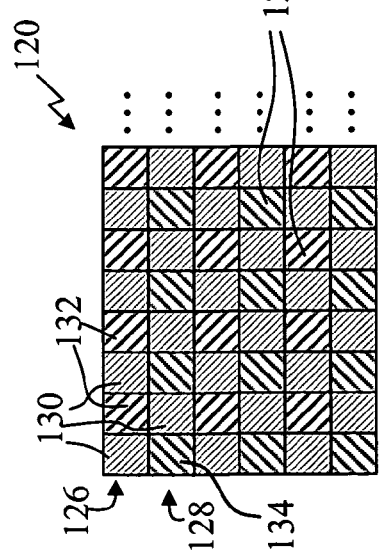
FIG. 1 depicts a partial array representative of a Bayer RGB (red, green, blue) imagery.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Many transforming or conversion techniques transform or convert data for analysis, storage, transmission or other uses. One example of a conversion is the conversion from a one domain to a second domain. For example, Fourier transform, Discrete Cosine Transform (DCT), wavelet transforms, and other such transforms convert data from the time domain to a frequency domain. The use of these transforms from time to frequency domain in data compression is well known in the art. For example, the use of wavelet based conversions (e.g. JPEG2000, Ogg, Tarkin, SPIHT, DCT based schemes, and other such wavelet transforms), allow for effective and accurate compression of image data. Often, the transform conversion maintains variations between data elements. For example, digital color imagery is often produced by using either three charge coupled devices (CCD) with red-green-blue color filters, or pixel filtering of a single CCD. With pixel level filtering, color filters are placed over individual pixels of the CCD to create a color filter array (CFA). Typically, three or four color bands are used for every 2×2 block of pixels.

Figure 2:
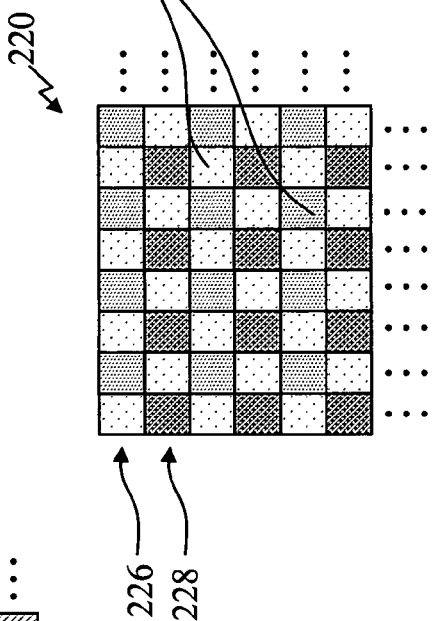
FIG. 2 depicts a partial array representative of pixels defined according to CYM imagery.
Figure 3:
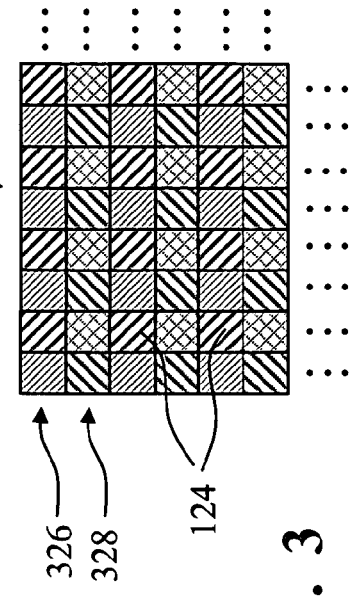
FIG. 3 depicts a partial array representative of pixels defined according to RGBE imagery.

FIGS. 1-3 show some common pixel color component patterns depicting simplified block diagram representations of portions of pixel arrays 120, 220 and 320, respectively. The pixels pixel array 120 of FIG. 1 is representative of Bayer RGB imagery; array 220 of FIG. 2 is representative of pixels defined according to CYM imagery; and array 320 of FIG. 3 is representative of pixels defined according to RGBE imagery. In FIG. 1, the first row 126 of pixels 124 comprise alternating red (R) and green (G) pixels 130, 132, respectively. The second row 128 of pixels comprise alternating blue (B) and green (G) pixels 134, 130, respectively. The rows of the array continue to alternate between red/green pixels and blue/green pixels. Because every other pixel is designated a different color component, there is a large frequency of variation between pixels. Similarly in FIG. 2, a first row 226 of pixels 124 comprise alternating yellow (Y) and cyan (C) pixels and a second row 228 of pixels comprise alternating magenta (M) and yellow (Y) pixels; and in FIG. 3 the array 320 contains a first row 326 of pixels 124 comprise alternating green (G) and red (R) pixels and a second row 328 of pixels comprise alternating blue (B) and emerald (E) pixels. Other forms of imagery include other varying pixel configurations. To produce viewable pictures from alternating pixel pattern imagery (e.g., Bayer RGB), a color interpolation scheme is typically used to determine the desired missing color information. For example, at a given blue pixel location, the red and green component values at that blue pixel location are determined from the surrounding pixel values (i.e., surrounding green and red pixel values).

In many imager systems, the color interpolation is done at or near the sensor. This interpolation typically increases the information of each resulting image by a factor of 1.5 to 3. For example, with a sensor having an array of 640×480 pixels with 8-bits of R, G, or B data being defined per pixel, the resulting Bayer RGB image data size is about 2.5 Mbits (i.e., 640×480×8 bits). Following the interpolation processes, each pixel is defined by 24-bits where each pixel has 8-bits of data representative of each of red (8-bits), green (8-bits) and blue (8-bits) color components, and the RGB image is three times larger (7.5 Mb). Typically this 24-bit RGB pixel representation can be reduced, for example to 16-bit YUV representation (4:2:2 bits, respectively), resulting in an image size of about 5.0 Mbits.

For storage or transmission of the color image, it is often desirable to reduce the image size while minimizing the loss of data. One option in reducing the amount of data stored and/or transmitted is achieved by storing and/or transmitting just the Bayer RGB image prior to interpolation. Further compression of the data can additionally be applied to the initial RGB image to further reduce the data to be stored or transmitted.

Many types of compression schemes can be employed to compress and reduce the amount of data that is to be stored and/or transmitted without adversely or only minimally degrading the quality of an image reproduced from the compressed data. Some examples of compression schemes include DCT based, JPEG2000, and other such compression schemes. Wavelet compression schemes tend to offer a high level of performance with respect to image quality versus compression ratios. One of the distinct features of wavelet schemes is that they tend to preserve differences or variations.

The compression algorithms utilize the frequency domain and thus, tend to preserve frequency variations. For imagery having alternating pixel color components, e.g., Bayer-type imagery, there is a large amount of high frequency information because the images alternate between color components. As such, some compression schemes tend to maintain or preserve those frequency variations. As a result, the varying pixel configurations associated with Bayer RGB imagery and other similar imagery configurations defined by alternating pixel color components results in a high degree of variation frequency between pixels. This large variation frequency is typically preserved when wavelet compression schemes are employed to compress the image data.

In a typical wavelet compression scheme, the image data is first converted into wavelet domain producing N×N wavelet coefficients for an N×N image. The image is typically split into tiles or regions of the image that are transformed and encoded separately, in part to manage memory limitations, to arbitrary depths resulting in collections of sub-bands that represent several approximation scales. A sub-band typically is a set of coefficients that represent aspects of the image associated with a certain frequency range as well as a spatial area of the image. Compression occurs in some implementations by at least in part discarding the wavelet coefficients that have the smallest value. In a Bayer RGB image, the pixel-to-pixel differences are dominated by the Bayer pattern (i.e., the variation between pixel color components R/G/R/G . . . and G/B/G/B . . . ).

Figure 4:
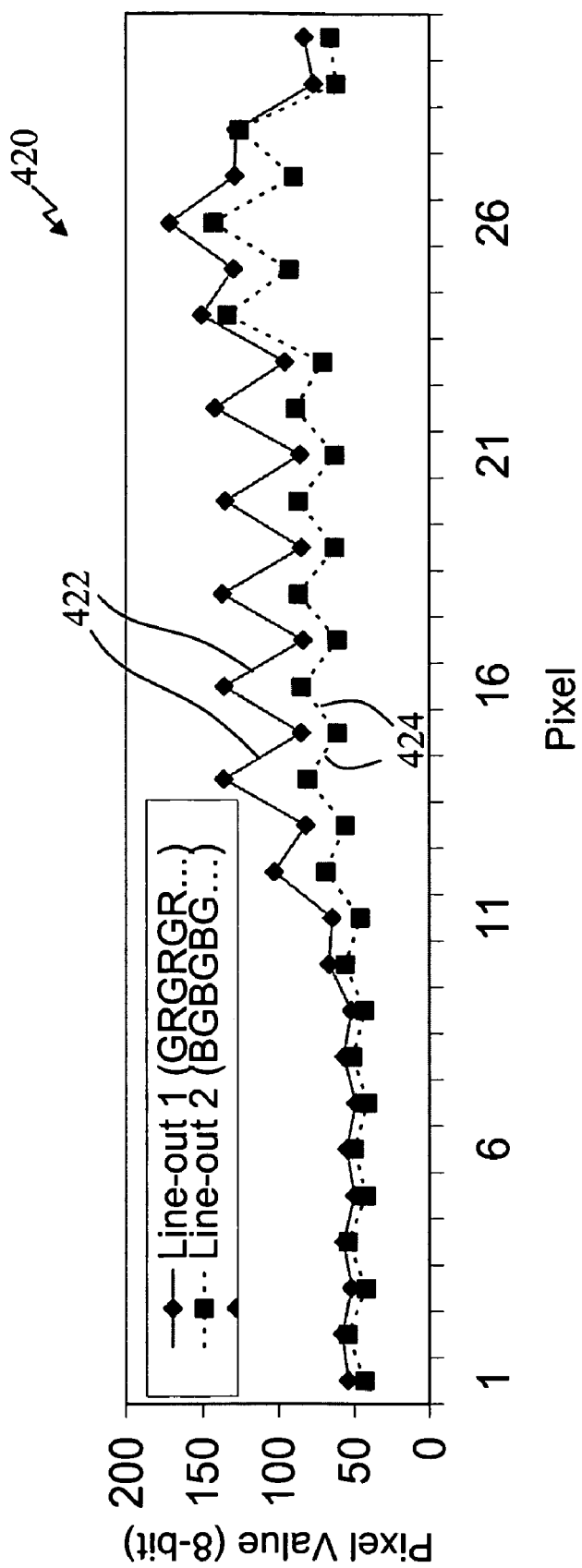
FIG. 4 depicts a graphical representation of an example of frequency variation of pixels over a portion of two rows of pixel data for a Bayer RGB imagery.

FIG. 4 is a graphical representation 420 of an example of the frequency variation of pixels over a portion of two rows of pixel data (e.g., the first row 126 and the second row 128) for the Bayer RGB imagery. When a wavelet compression is applied directly to a Bayer RGB image, the compression algorithm typically preserves the artificial image variations introduced by the Bayer RGB filter in addition to or as opposed to preserving the real variations across the image. As can be seen in FIG. 4, there exists a relatively large degree of variation 422 between neighboring red and green pixels, and similarly large variations 424 are seen between neighboring blue and green pixels. Due to this relatively large amount of variation, upon wavelet compression of pixel data to the frequency domain, a large amount of frequency energy is preserved that provides relatively little, if any, benefit to the overall image quality, and thus, unnecessary digital data is maintained upon compression of an image due to the variation between neighboring pixels.

Figure 6:
FIG. 6 depicts a monochrome image of the selected scene of FIG. 5.
Figure 5:
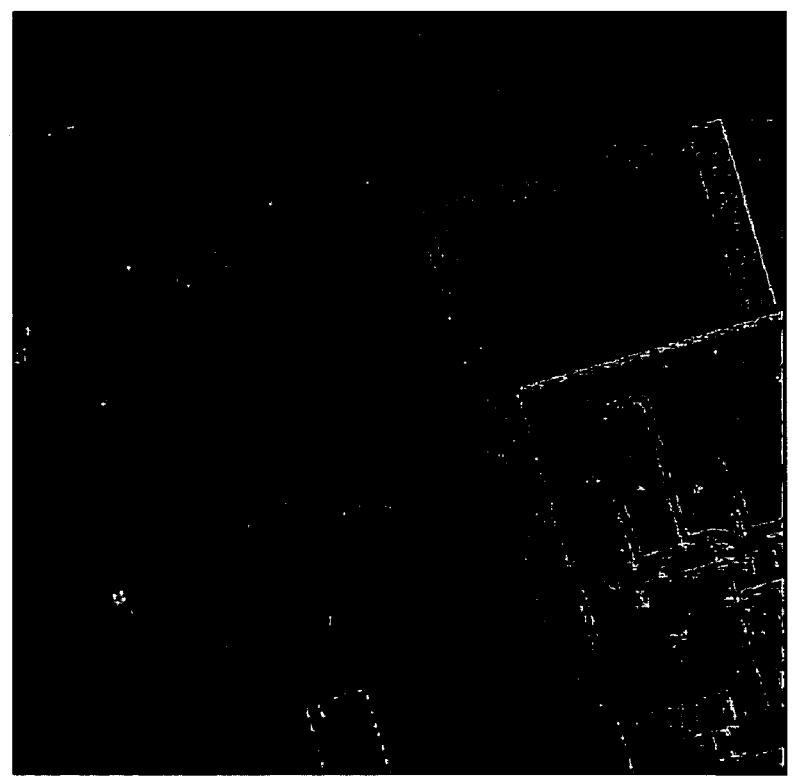
FIG. 5 depicts a Bayer RGB image of a selected scene.

FIG. 5 depicts a Bayer RGB image 520 of a selected scene. FIG. 6 depicts a monochrome image 620 of the same selected scene. Upon compression of each image 520, 620 through a wavelet compression, the data associated with variation between pixels are preserved for the Bayer RGB image.

A compression loss can be estimated by assuming that the highest frequency (pixel-to-pixel level) wavelet coefficients are not discarded by the compression scheme. As an example, assume a monochrome picture can be compressed by 10:1 (i.e., 9 out 10 coefficients are discarded). For a Bayer RGB picture of the scene 520 about 25% of the coefficients are needed to preserve the Bayer pattern and the remaining 75% of the coefficients undergoes 10:1 compression. Thus, the compression ratio for the Bayer RGB image ($CR_{Bayer}$) is approximately related to the monochrome compression ratio, CR by:

$$CR_{Bayer} = (0.25 + 0.75/CR)^{-1}.$$

As such, if the monochrome image 620 is compressed 10:1 (CR=10), then the same image as a Bayer RGB image can typically only be compressed 3:1 ($CR_{Bayer}$=3) for a given quality.

This difficulty in compressing Bayer RGB can be seen by comparing the pixel energy of a Bayer RGB verses pixel energy of a monochrome image of the same scene that have undergone a two dimensional, discrete wavelet transform (DWT). Pixel values can be thought of as energy. Total energy of an image can be defined by summing the pixel values and average energy by dividing the total by the number of pixels. The same concept can be applied to DWT coefficients.

Figure 7:
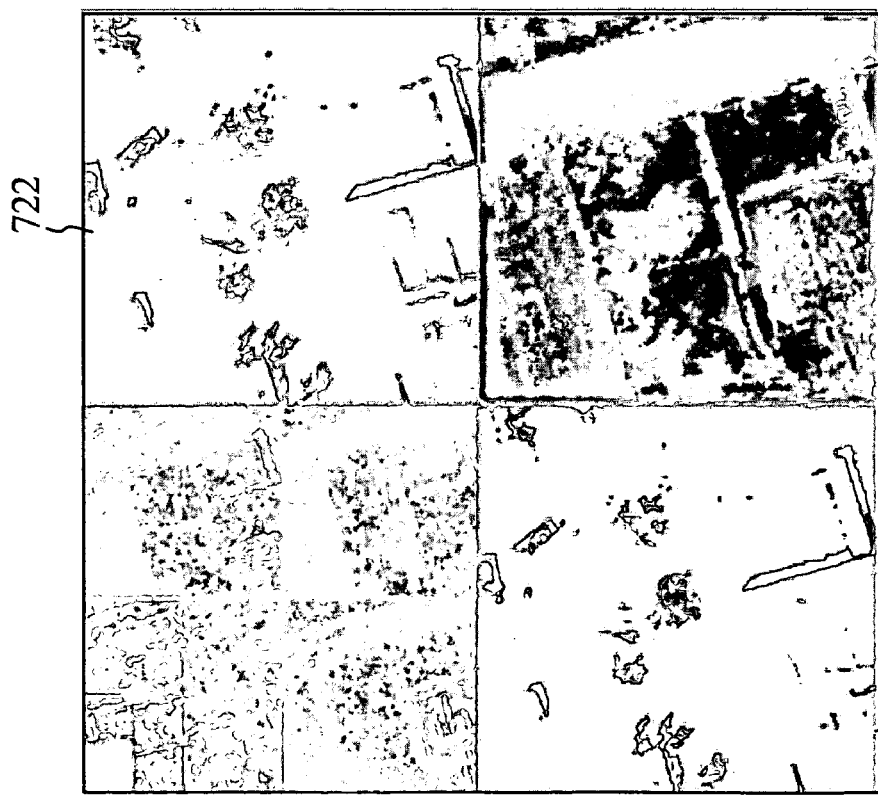
FIG. 7 depicts a representative image of a discrete wavelet transform of the Bayer RGB image of FIG. 5 in the wavelet domain.

FIG. 7 depicts a representative image 720 of a discrete wavelet transform of the Bayer RGB image 520 in the wavelet domain. It can be seen that there is a large amount of energy (with lighter areas representative of larger amounts of energy information and darker regions representative of areas with smaller amounts of energy information) associated with the higher frequency quadrants (e.g., upper right 722, lower left 724, and lower right 726).

Figure 8:
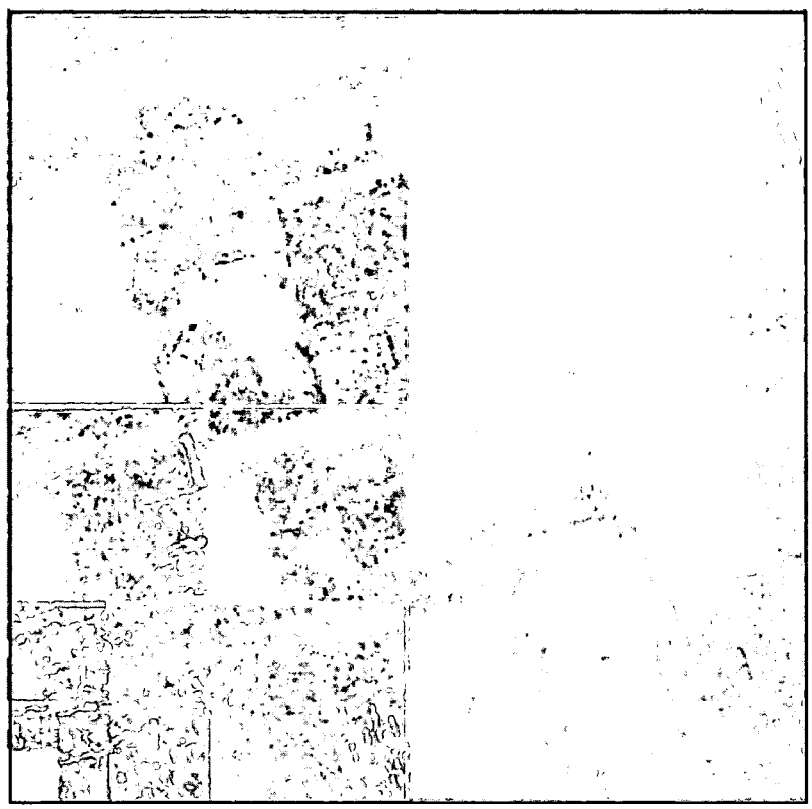
FIG. 8 depicts a representative image of a discrete wavelet transform of the monochrome image of FIG. 6 in the wavelet domain.
Figure 9:
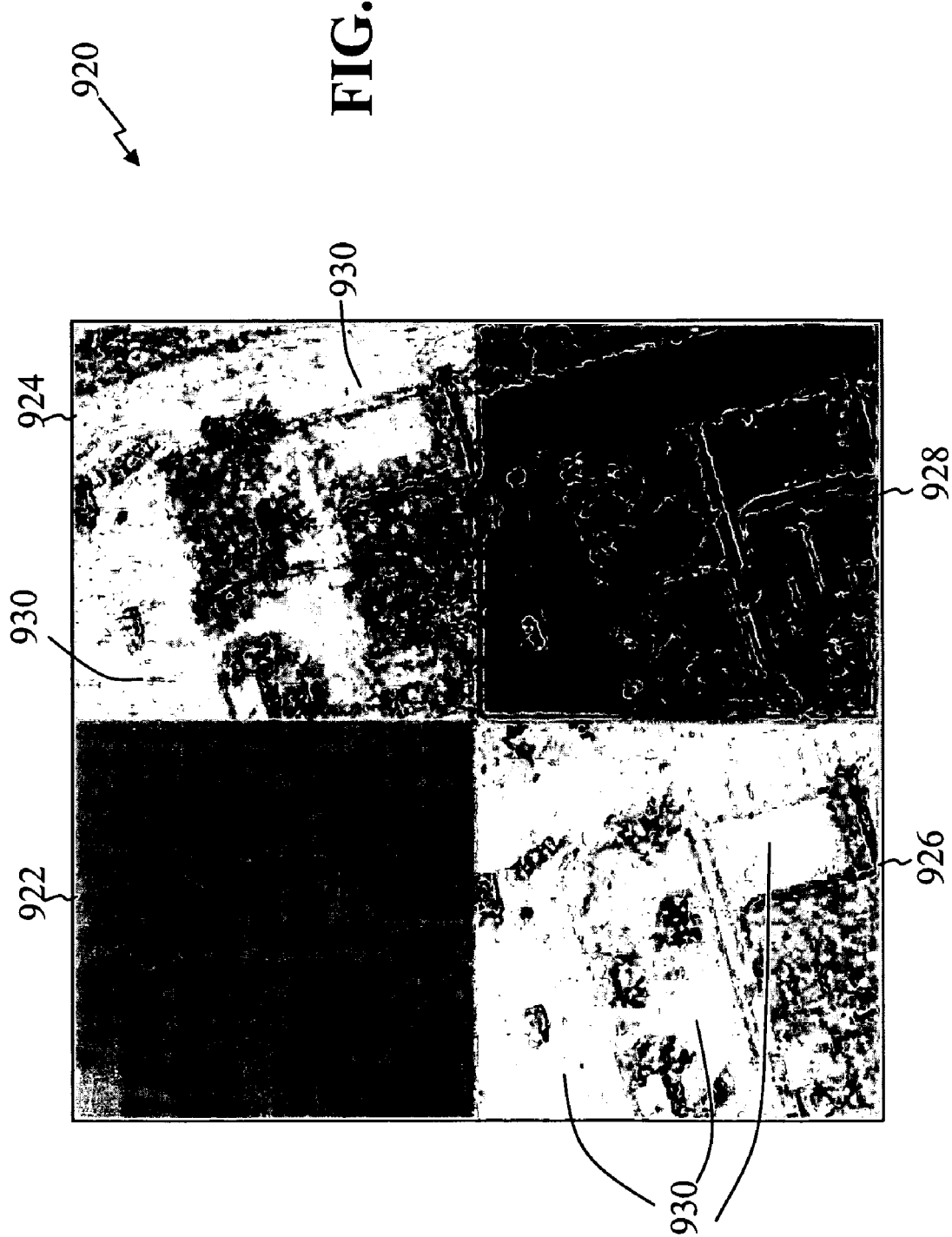
FIG. 9 depicts an image representation of a subtraction between the Bayer RGB wavelet domain image of FIG. 7 and the monochrome wavelet domain image of FIG. 6.

FIG. 8 depicts a representative image 820 of a discrete wavelet transform of the monochrome image 620 in the wavelet domain. The wavelet filter applied for example can be a base-4 Daubechies wavelet. FIG. 9 depicts an image representation 920 of a subtraction between the Bayer RGB wavelet domain image 720 and the monochrome wavelet domain image 820. Based on the difference image 920 comparing the difference between the Bayer and monochrome wavelet transform image representations 720 and 820, respectively, it can be seen that the spatial low frequency information 922 (upper left quadrant) is almost the same (with dark regions representing similar frequency information, and differences represented by light regions) for both Bayer and monochrome transforms, but that there is large differences, large amounts of light areas 930, in spatial high-frequency information (the other quadrants 924, 926 and 928).

Figure 10:
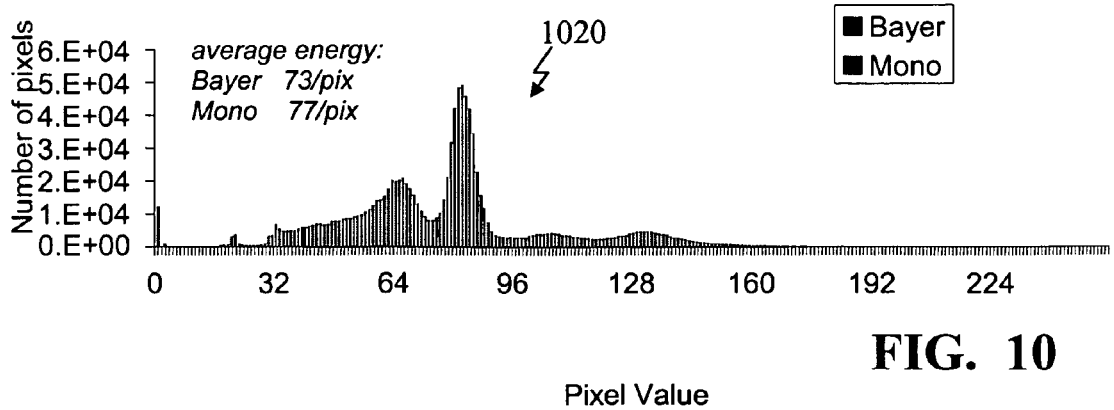
FIGS. 10 and 11 depict graphical histogram representations of pixel values to number of pixels for the monochrome image of FIG. 6 and Bayer RGB image of FIG. 5, respectively.
Figure 11:
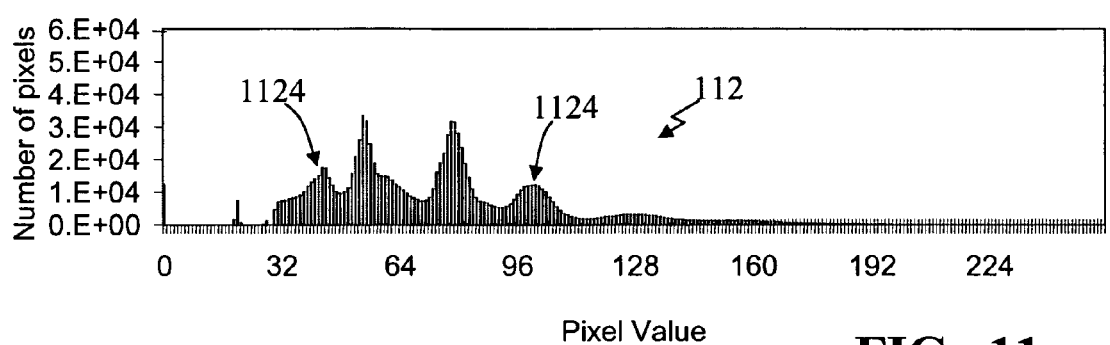
Figure 12:
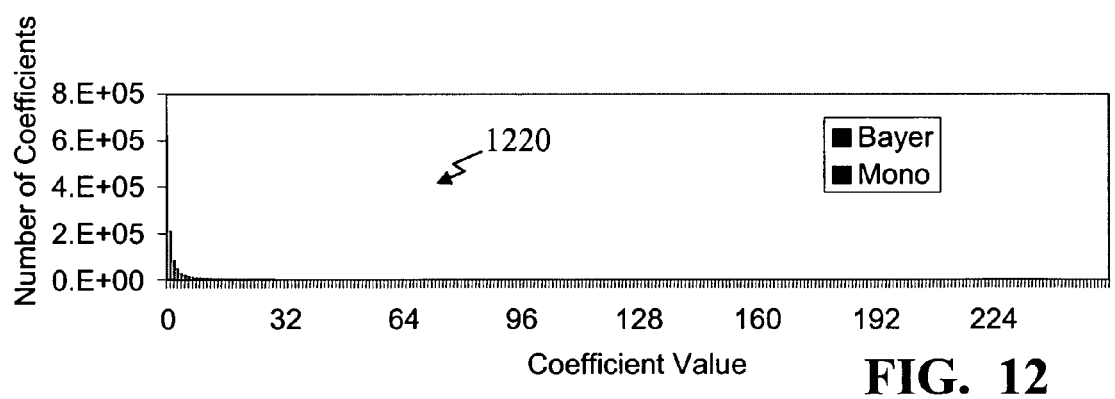
FIGS. 12 and 13 depict graphical histogram representations of conversion coefficient values to numbers of coefficients for the monochrome image of FIG. 6 and Bayer RGB image of FIG. 5, respectively.
Figure 13:
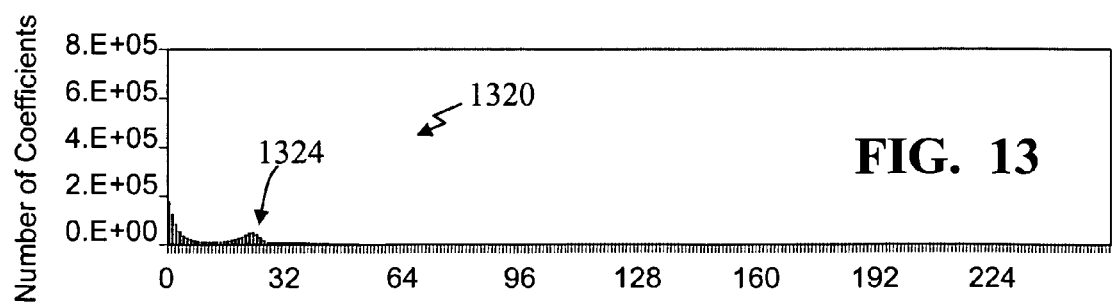
Figure 14:
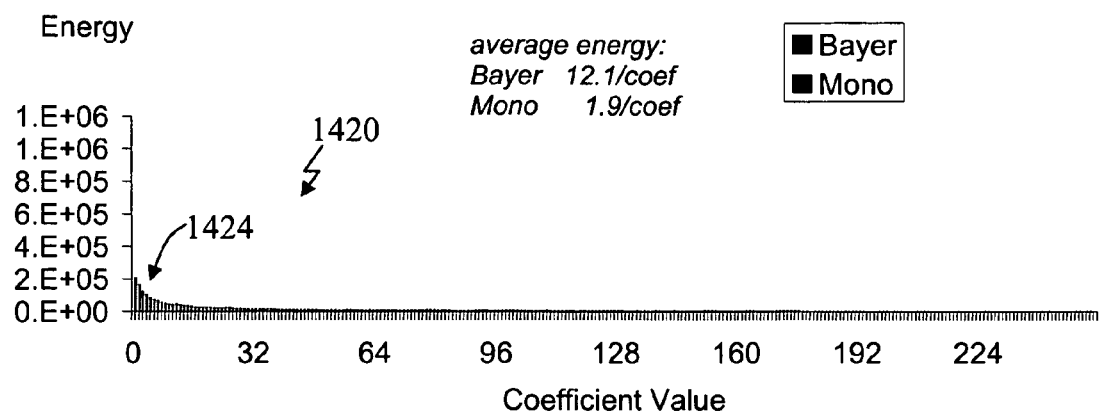
FIGS. 14 and 15 depict graphical histogram representations of conversion coefficient values to pixel energy for the monochrome image of FIG. 6 and Bayer RGB image of FIG. 5, respectively.
Figure 15:
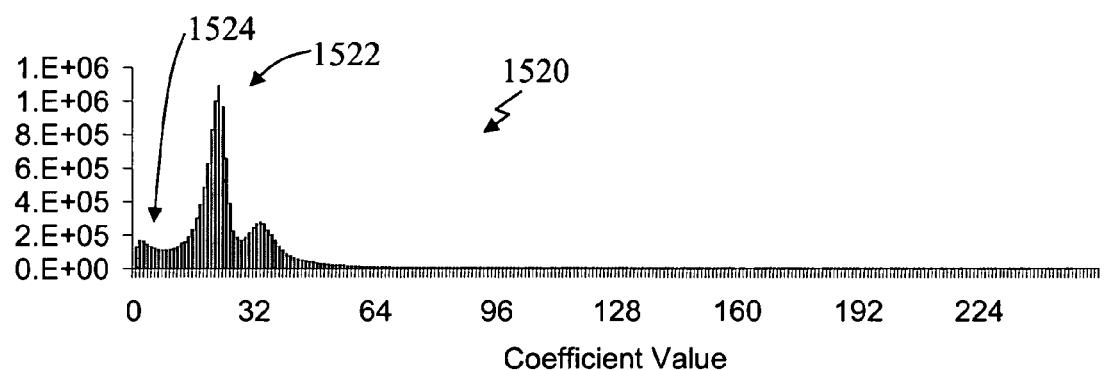

FIGS. 10 and 11 depict graphical histogram representations 1020, 1120 of pixel values to number of pixels for the monochrome image 620 of FIG. 6 and Bayer RGB image 520 of FIG. 5, respectively; FIGS. 12 and 13 depict graphical histogram representations 1220, 1320 of conversion coefficient values to numbers of coefficients for the monochrome image 620 of FIG. 6 and Bayer RGB image 520 of FIG. 5, respectively; and FIGS. 14 and 15 depict graphical histogram representations 1420, 1520 of conversion coefficient values to pixel energy for the monochrome image 620 of FIG. 6 and Bayer RGB image 520 of FIG. 5, respectively.

It can be see from the histogram representations of FIGS. 10-15 that the Bayer RGB DWT contains much more energy at higher coefficients 1522 centered around a coefficient of about 23, while the lower frequency information 1524 of the Bayer RGB DWT is substantially similar to the lower frequency information 1424 of the monochrome image. As shown in comparison, the Bayer RGB histogram has additional peaks (e.g., peaks indicated by reference number 1124) associated with the Bayer CFA of FIG. 11 over the monochrome DWT as shown in FIG. 10. The histogram of the Bayer DWT shows a second peak of coefficients 1324 having a value centered at about 23. Coefficient energy can be calculated, for example, by multiplying the coefficient value by the number of coefficients (pixels in the wavelet domain) with that value. FIGS. 10-15 demonstrate a potential dramatic difference between Bayer RGB and monochrome compression. As shown in the FIGS. 14 and 15, the energy per coefficient is on average about 12.1 for Bayer RGB DWT and about 1.9 for the monochrome DWT. The Bayer RGB energy for the untransformed image in this example is 73/pix and the monochrome energy in this example is 77/pix. In many implementations, compression schemes discard lowest energy coefficients first. For the Bayer RGB, a great deal more energy would be discarded as compared to the monochrome image which will result in poorer image quality for similar compression ratios.

Some embodiments reduce the amount of digital data utilized upon transformation and/or compression of images by at least in part reducing the pixel variation between neighboring pixels and/or eliminating the need to preserve the excess energy associated with the color component variation between pixels. By condensing or cooperating pixel data associated with the same color component the variation between pixels is typically dramatically reduced, and thus, reducing the amount of data that is maintained.

Figure 16:
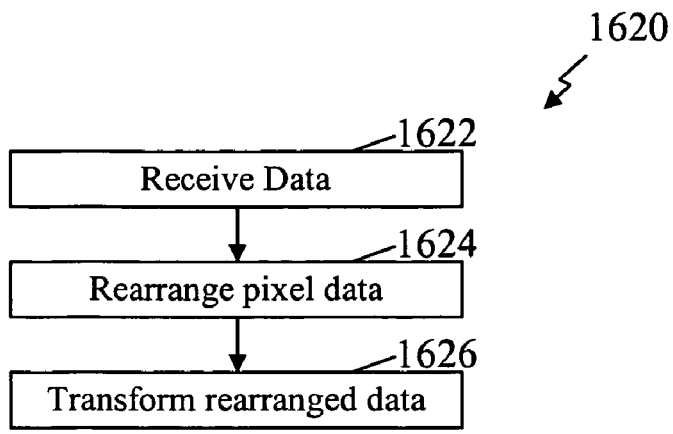
FIG. 16 depicts a simplified flow diagram of a process for use in transforming and/or compressing image data.

FIG. 16 depicts a simplified flow diagram of a process 1620 for use in transforming and/or compressing image data. In step 1622, image data is received. In step 1624, the pixel data is processed, coordinated and/or rearranged to reduce frequency variation and/or the energy distribution at least between neighboring pixels. In step 1626, the rearranged pixel data is transformed or condensed according to a desired transform function, for example using a wavelet compression scheme.

Figure 17:
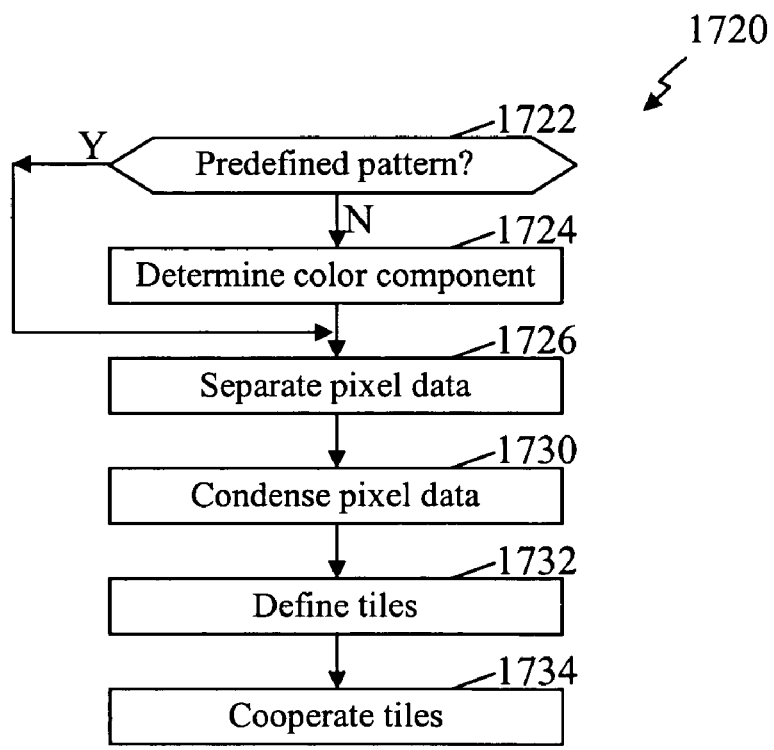
FIG. 17 depicts a simplified flow diagram of a process for use in rearrange pixel data to reduce frequency variation and/or the energy distribution.

FIG. 17 depicts a simplified flow diagram of a process 1720 for use in implementing in some embodiments the step 1624 of FIG. 16 to rearrange the pixel data to reduce frequency variation and/or the energy distribution. In step 1722 the process determines whether there is a predefined pattern for the pixel data. For example, with many image capturing devices, the pixel data is delivered in a predefined format, such as a pattern similar to the arrangement of pixel color component patterns, color filter patterns of the detector array, in a red, green, blue pattern, or some other pattern that is known or designated. When the pixel data is not received in a known pattern, the process 1720 proceeds to step 1724 where the color component of the pixel data is determined or other patterns of the pixel data is determined based on other characteristics of the pixel data.

In step 1726, the pixel data is separated, typically based on the color component of each pixel data. For example, the pixel data can be stored in memory according to the pixel color component. In step 1730, pixel data are collected and condensed according to color component defining plurality of condensed pixel data, such as one or more condensed red pixel data consisting of the pixel data associated with the red color component, one or more condensed green pixel data consisting of the pixel data associated with the green color component, and one or more condensed blue pixel data consisting of the pixel data associated with the blue color component. In some implementations, pixel data is coordinated so that pixels of the same color are processed together, such as defining a block of pixels and evaluating the pixels of each color separately from the other colored pixels.

In step 1732, the regions or tiles of a representative image are defined based on the plurality of condensed pixel data. In step 1734, the plurality of condensed pixel data are cooperated or concatenated according to the defined regions or tiles defining the representative of the image. Some embodiments parse or separate the pixel data according to their color components, and cooperate or condense the pixels based on their color components. As such, the pixels associated with the green color component are condensed, the pixels associated with the red color component are condensed and the pixels associated with the blue color components are condensed. Upon cooperation of the pixel data based on color component, data representative of the image is compiled using the cooperated pixel data.

The collecting or condensing of the pixel data according to the color components into tiles reduces and/or eliminates many of the problems associated with compressing Bayer RGB-type images and other similar imagery schemes. FIG. 18 depicts a simplified block diagram representation of an image 1820, for example, a still image captured with a digital camera; one frame of a series of frames of a video or motion picture; or other such images. As described above, the image is detected through an array of detectors that represent an array of pixels through which the image can be regenerated. The pixel data obtained from the array of detectors is, for example when provided in a Bayer RGB image, received as a series of red (R), green (G) or blue (B) color component pixel data.

The pixel data is condensed according to the color component. If such a cooperation of pixel data were to be displayed, the image would be divided into regions or tiles with each region being associated with one of the color components. FIG. 19 depicts a simplified block diagram representation of a reproduction of representative image 1920 based on the condensed pixel data. A first region 1922 forms a portion of the representative image based on the pixel data associated with the green color component, a second region 1924 forms a second portion of the image with pixel data associated with the red color component, and a third region 1926 forms a third portion of the image with pixel data associated with the blue color component.

FIG. 20 depicts a simplified block diagram representation of an alternate reproduction of a representative image 2020 of image 1820 based on color condensed pixel data. A first region 2022 forms a portion of the representative image based on the pixels data associated with the green color component, a second region 2024 forms a second portion of the image with pixel data associated with the red color component, a third region 2026 forms a third portion of the image with pixel data associated with the blue color component, and a fourth region 2028 forms a fourth portion of the image with pixel data associated with the green color component. In this configuration, the image is divided into quadrants based on color components. The first and fourth regions or quadrants 2022 and 2028, respectively, can be defined based on green pixel data of every other row (e.g., first quadrant 2022 can be formed from odd rows (first row, third row, fifth row, etc.); and the fourth quadrant 2028 can be formed from even rows (second row, fourth row, sixth row, etc.)), can be formed from every other pixel in a row, or can be formed through some other condensing of pixel data.

Figure 22:
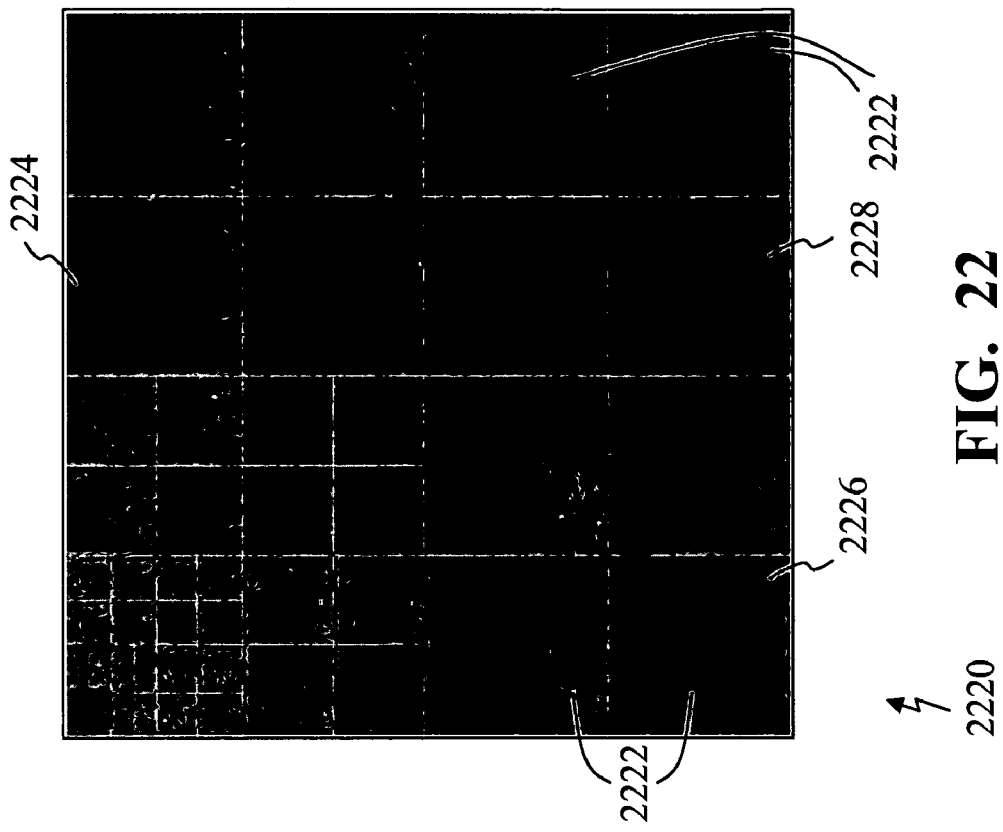
FIG. 22 depicts a representative image of the condensed pixel image of FIG. 21 following a wavelet conversion.
Figure 21:
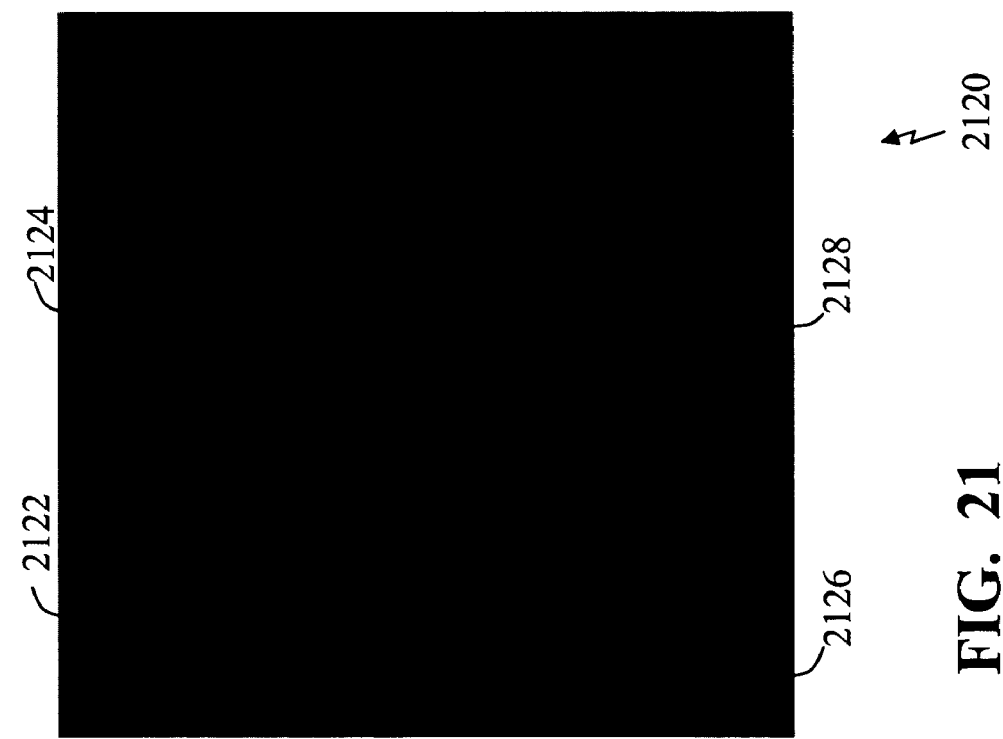
FIG. 21 depicts a block diagram of a representative image with condensed pixel data of the Bayer RGB image of FIG. 5.

Upon compression (e.g., through wavelet transform), the variation between pixels is dramatically reduced, and thus, the energy distribution for the color condensed RGB DWT is reduced. In some embodiments, the energy distribution for the color condensed RGB DWT is similar to that of the monochrome DWT. FIG. 21 depicts a block diagram of a representative image 2120 with condensed pixel data of the Bayer RGB image 520 of FIG. 5. The pixel data has been condensed into four quadrants according to color components, quadrant 2122 for green pixel data, quadrant 2124 for red pixel data, quadrant 2126 for blue pixel data and quadrant 2128 for green pixel data. FIG. 22 depicts a representative image 2220 of the condensed pixel image 2120 following a wavelet conversion similar to the conversions of FIG. 7, where it can be seen that the energy (with lighter areas representative of larger amounts of energy information and darker regions representative of areas with smaller amounts of energy information) associated with the higher frequency quadrants (second, third and fourth quadrants 2224, 2226 and 2228, respectively) is significantly reduced over the representative image 720 of FIG. 7. As such, the condensing of the pixel data reduces the frequency variation at least between neighboring pixel data reducing an amount of data needed upon compression of the image while maintaining a quality of the image upon decompression.

Further, as is known wavelet compression generates tiles 2222. The fact that the color condensed regions 2122, 2124, 2126 and 2128 are organized in quadrants reduces and/or avoids artifacts at the edges of the tile 2222 upon conversion and information specific to the image variation is maintained instead of neighboring pixel variations. Therefore, the color condensing reduces the amount of unnecessary frequency variation information that is maintained.

Figure 23:
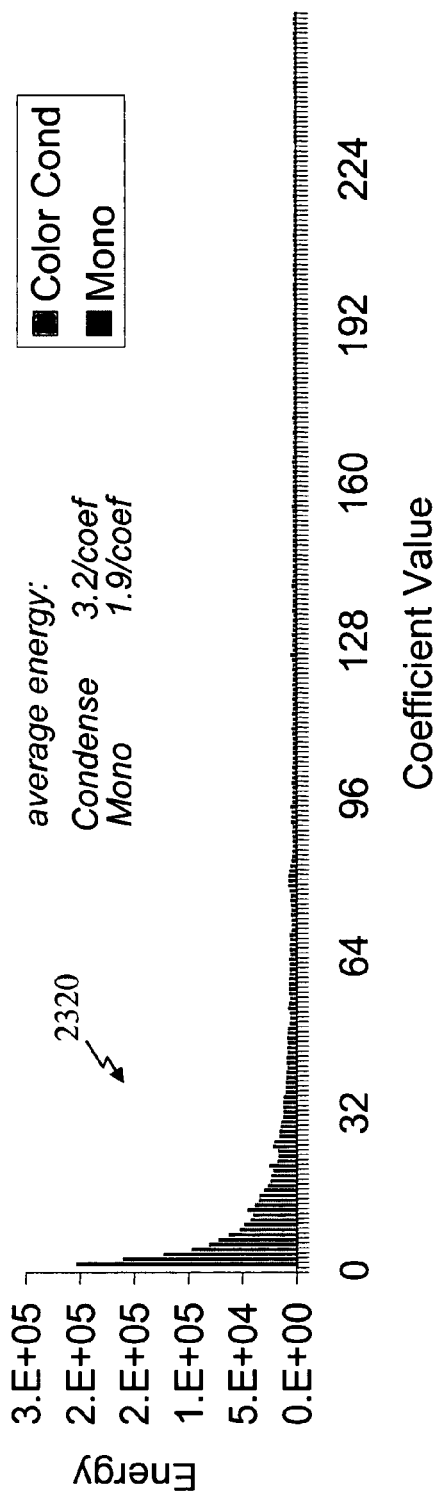
FIGS. 23 and 24 depict graphical histogram representations of conversion coefficient values to pixel energy for the monochrome image of FIG. 6 and the color condensed Bayer RGB image of FIG. 22, respectively.
Figure 24:
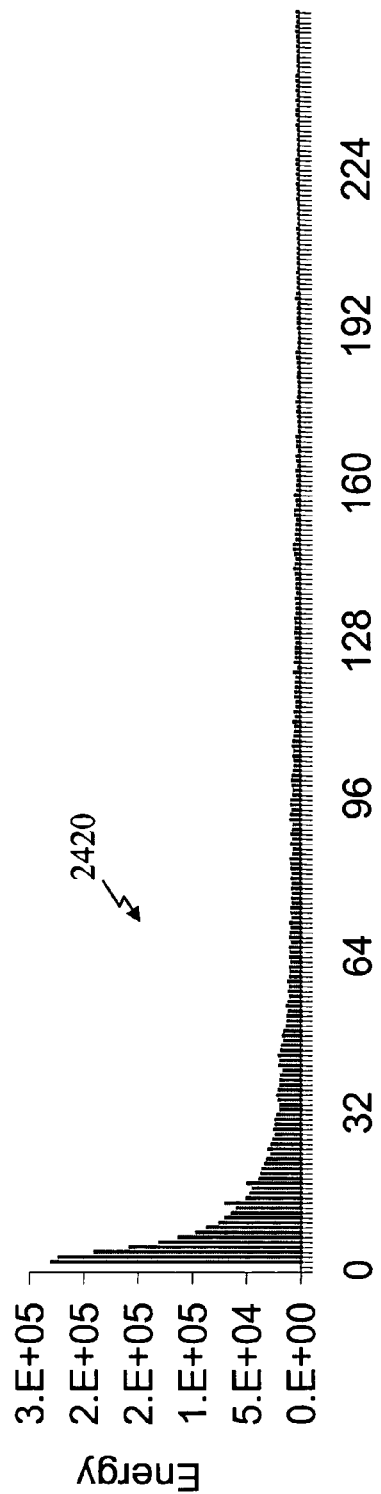

FIGS. 23 and 24 depict graphical histogram representations 2320, 2420 of conversion coefficient values to pixel energy for the monochrome image and the color condensed Bayer RGB image 2020, respectively. The average energy per coefficient for this example is approximately 3.2/coef for the color condensed image 2420 compared to 1.9/coef for the monochrome image 1020, and 12.1/coef for the basic Bayer RGB 1520.

The cooperating of the pixel data according to color component reduces the variation between neighboring pixels, as most pixels of a color component are neighbored by pixels of the same color component. Only those pixels on the boundaries of the regions or tiles 2122, 2124, 2126 and 2128 have neighboring pixels of a different color component. Upon transformation (e.g., wavelet compression) of the color condensed image data cooperated by color component, a significant amount of variation data no longer has to be maintained due to the near complete elimination of variation of color components between neighboring pixels.

Figure 25:
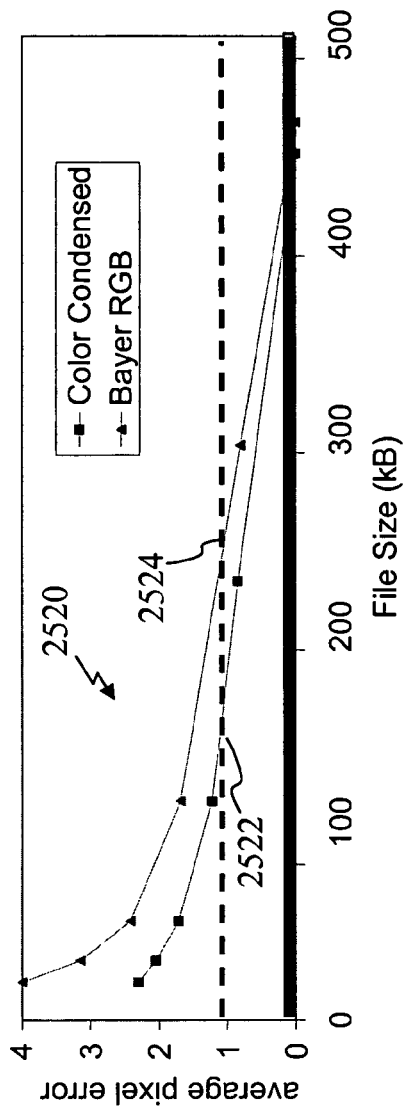
FIG. 25 depicts a graphical representation of file size to average pixel error for a comparison of file size for a compressed Bayer RGB image of FIG. 5 and a compressed color condensed image of FIG. 22.

Although it is difficult to define a simple measure of image quality, a quantitative measure is useful for comparisons. An average pixel error can be defined as:

$$\varepsilon_{pix} = \frac{\sum_{i,j} |P_{i,j} - P^{ref}_{i,j}|}{N_{pix}},$$

where $P_{i,j}$ and $P^{ref}_{i,j}$ are the pixel values of the compressed image and original image, respectively, and $N_{pix}$ is the number of pixels. The average pixel error for the color condensed data and Bayer RGB image are compared for various compression rates to demonstrate the reduced data size. FIG. 25 depicts a graphical representation 2520 of file size to average pixel error for a comparison of file size for a compressed Bayer RGB image of a given scene (e.g., scene 520 of FIG. 5) and a compressed color condensed image of the same scene (e.g., color condensed representative image 2120 of FIG. 21). Accordingly, for a given average pixel error, file size for the compressed color condensed imagery is about one half the size as the compressed Bayer RGB file size. For example with a given scene, with an average pixel error of about 1, the wavelet compressed color condensed image of the scene has a file size 2522 of about 120 Kbits, where as the compressed Bayer RGB image of the scene has a file size 2524 of about 240 Kbit, effectively having double the file size to achieve substantially the same error rate. As such, the color condensed image can in some instances be compressed approximately by a factor of two more than the Bayer RGB image for a given average pixel error.

Figure 26:
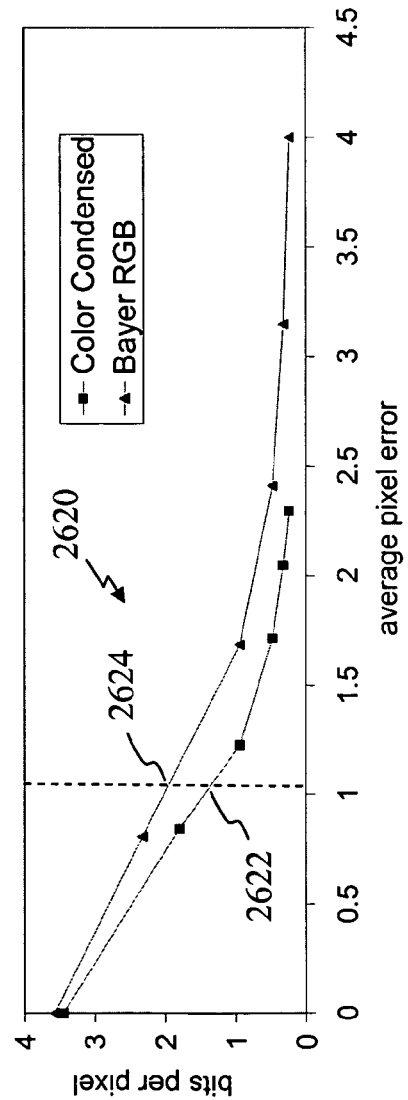
FIG. 26 shows a graphical representation 2620 of a comparison of bits per pixel to average pixel error for the compressed Bayer RGB image of FIG. 5 and the compressed color condensed image of FIG. 22.

FIG. 26 shows a graphical representation 2620 of a comparison of bits per pixel (file size divided by the number of pixels) to average pixel error for the compressed Bayer RGB image of FIG. 5 and a compressed color condensed image of FIG. 22. Similar to the graphical results demonstrated in FIG. 25, for a compressed image to have an average pixel error of about 1, approximately 1.2 bits 2622 are maintained per pixel for a color condensation image, while about 2.2 bits per pixel 2624 are maintained for the Bayer RGB image. Therefore, it can be seen that by color condensation images, the images can be compressed to smaller file sizes while achieving substantially the same or better picture quality upon decompression and display, printing or reproduction of the images. The compressed Bayer RGB imagery has a lower quality than the color condensed imagery for a given compression ratio. Further, as the compression ratio gets higher, high-frequency artifacts begin to appear as well as lower frequency color artifacts with decompressed Bayer RGB imagery, while the decompression of color condensed imagery provides improved quality, and tends to instead simply defocus and introduce fewer artifacts.

Figure 27:
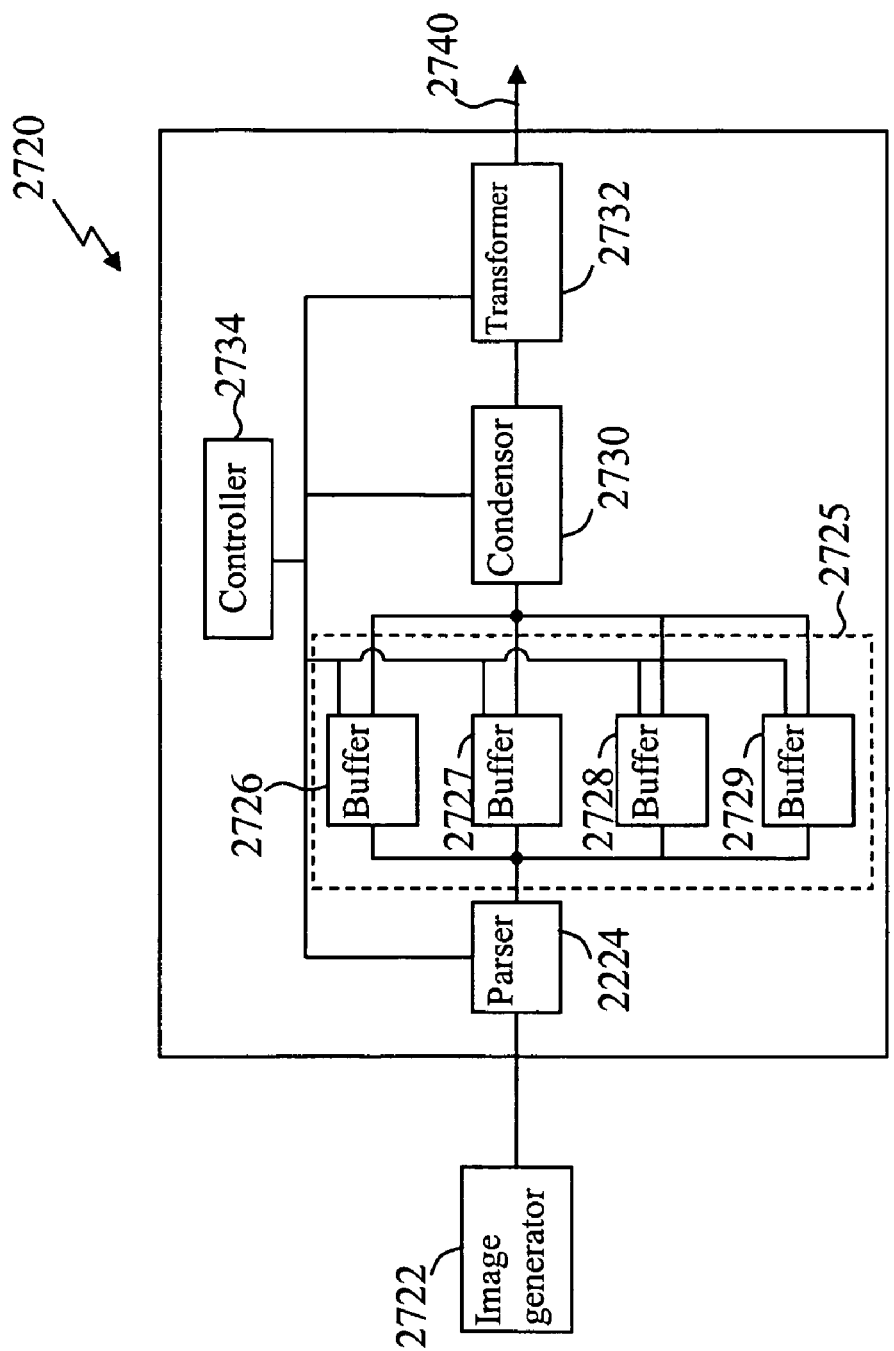
FIG. 27 depicts a simplified block diagram of a system according to some embodiments that compresses digital image data.

FIG. 27 depicts a simplified block diagram of a system 2720 according to some embodiments that compresses digital image data. The system includes a data source 2722 (which in some instances is a data generator), a parser 2724, memory 2725 (e.g., that can include one or more buffers 2726-2729), a data condenser system 2730, a data transformer system 2732 and a controller 2734. The controller 2734 controls the over all operation of the system 2720 and can be implemented, for example through a microprocessor, computer, field programmable gate array (FPGA), software, firmware, and/or other such controllers. The data source receives and/or generates the image data. In some implementations, for example, the data source can be a digital camera that takes digital images upon activation. Substantially any type of digital camera or recording device can be employed that provides digital imagery at desired resolutions and at desired bit rates. In many applications, the data source supplies imagery data at rates greater than 100 megabits of data per second, and often greater that 500 megabits per second (e.g., the digital camera can take one or more digital images outputting 700 megabits of data or more per second). In some embodiments, the system can include an analog to digital converter (not shown) to convert data received from the source 2722 in an analog format to a digital format suitable for the parser 2724.

In many applications, the pixel data is received from the source 2722 in a predefined pattern, such as, the pixel data may be received in an order similar to the detector array arrangement. In some implementations, the controller 2734 is notified and/or identifies the pattern, or determines color components of the pixel data. Based on the predefined pattern (e.g., a known color filter array for a CCD) or based on a determination, the parser 2724 separates the pixel data, typically according to color component (e.g., red, green blue components; yellow, cyan and magenta; green, red, blue and emerald; or other such components) and forwards the pixel data to the memory and/or an appropriate buffer, e.g., green pixel data or a first set of green pixel data to a first buffer 2726, red pixel data to a second buffer 2727, blue pixel data to a third buffer 2728, and a second set of green pixel data to a fourth buffer 2729, when a fourth buffer is desired. In some embodiments, the controller 2734 directs the parser 2724 for distributing the pixel data. Other embodiments can include more or less buffers depending on the number of color components and/or the delivery and/or retrieval of the data. In some embodiments, a single buffer is used, for example where pixel data is received previously separated (e.g., separated based according to color component or some other factor), or other configurations. The parser, buffer and/or controller, in some embodiments can be implemented through an FPGA, application specific integrated circuit (ASIC), processor or other similar device that can control the routing of the pixel data.

The buffer(s) 2726-2729 receive the pixel data and temporarily stores the data. The condenser system 2730 retrieves the pixel data from the memory or buffers in a color condensed sequence. For example, the color condenser system can retrieve the pixel data sequentially from the first buffer 2726 consisting of the pixel data associated with a first color component or first set of a color component (e.g., a first set of green component pixel data), a second color component from the second buffer 2727 (e.g., red component pixel data), a third color component from the third buffer 2728 (e.g., blue component pixel data), and a fourth color component or second set of the first color component from the fourth buffer (e.g., a second set of green component pixel data). In some embodiments, the condenser system 2730 is part of the transformer system 2732 or the transformer system 2732 can directly retrieve the pixel data from the memory as dictated by the controller 2734 and eliminating the condenser system 2730.

The transformer system 2732 receives the color condensed pixel data and transforms and/or compresses the condensed image data. One or more of many different types of transforms can be performed by the transformer system 2732 as are known in the art. For example, in some embodiments, the transformer system performs a wavelet compression, such as a compression consistent with JPEG2000 or other wavelet compression, or other such transforms or data compressions.

In some embodiments, the transformer system 2732 can be implemented through an ASIC, such as an ASIC for performing JPEG2000 or JPEG.

The resulting transformed and/or compressed pixel data 2740 typically has a data size that is less than the data size that would be obtained without the condensing of the pixel data, e.g., condensing according to color component. Therefore, storage size and/or bandwidth needed in storing and/or transmitting the compressed image is reduced. Similarly, the time needed in storing and/or communicating the compressed image is reduced.

In some embodiments, the system 2720 processes the pixel data without the need for the memory 2725 and/or one or more buffers 2726 where the compression algorithm is modified to achieve substantially the same condensation effect. For example with JPEG, instead of performing a DCT on an 8×8 block of pixels, the DCT can be performed on an 8×8 block of a single color, e.g., red pixels.

Figure 28:
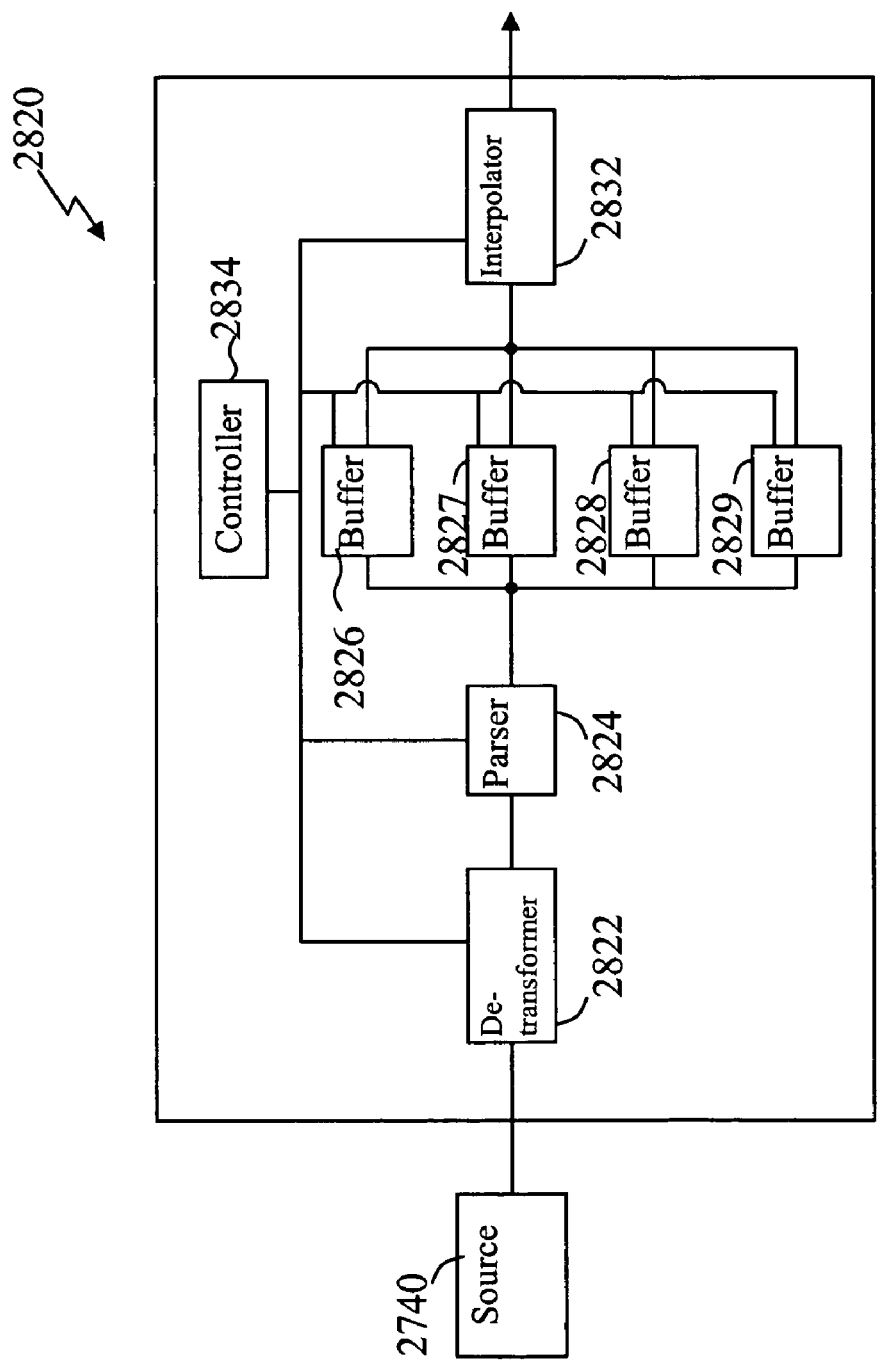

FIG. 28 depicts a simplified block diagram of a reproduction system 2820, such as a printer, a display, a comparator, or other rendering system. The system 2820 includes a de-compressor or de-transformer 2822, parser or demultiplexor 2824, one or more memory 2826-2829 (e.g., buffers), a color interpolator 2832, a display or other rendering device 2834, and a controller 2836. A source 2740 of compressed and condensed image data couples with the reproduction system supplying data. The controller 2836 provides control over the system, and can be implemented through a microprocessor, processor, computer, software, firmware, or other similar controllers and/or combinations thereof.

Upon receipt of the compressed image 2740, the reproduction system 2820 decompresses the content through a de-compressor 2822 (e.g., through a wavelet decompression system as are known in the art). In some implementations, the reproduction system is identified, for example, in a header or otherwise notified. Alternatively, the reproduction system determines the format, for example, by analyzing the data. A parser or demultiplexor 2824 separates the pixel data, for example, according to color component. In some embodiments, the separated pixel data is directed to one or more memory 2826-2829 (e.g., buffers). The pixel data is retrieved from the buffers 2826-2829 in a predefined format to rearranges the pixel data in a defined imagery format (e.g., Bayer RGB format, by alternately pulling pixel data from a first buffer 2826 and a second buffer 2827 for a predefined number of pixels to define even numbered pixel rows of a image, and alternatively pulling pixel data from a third buffer 2628 and a fourth buffer 2829 for a predefined number of pixels to define odd numbered pixel rows). A color interpolator 2832 receives the reformatted pixel data and applies a color interpolation scheme to the reformatted pixel data prior to a display 2834 displaying and/or otherwise rendering (e.g., printing) of the regenerated image.

The picture quality achieved upon regeneration is typically at least as high as the quality that might be achieved without color condensing. In many instances the image quality is greatly increased. The color condensing can limit the shadowing, frequency artifacts, and other adverse effects that can degrade the quality of the regenerated image. Further, the color condensing allows the picture data to be compressed while maintaining a picture quality, and typically providing an improved picture quality at reduced compression rates.

The present embodiments, at least in part improve the compression of image data by collecting or condensing pixel data according to a color component associated with that pixel into tiles and/or quadrants defining a representative picture, frame or other image. Once the pixel data is collected according to color component into tiles a compression scheme is used, such as wavelet compression, JPEG2000, DCT or other types of relevant compression. The color condensation techniques provided by the present embodiments can be used for pre-processing of substantially any relevant image data, multimedia stream (e.g., video stream, high definition television type signals, and the like), and other relevant data prior to compression. Additionally and/or alternatively, received data, such as full color images, can be decimated to a desired format or pattern (e.g., decimated into a Bayer RGB type pattern), and then applying color condensation according to the present embodiments prior to compressed to improve compression of the data (e.g., the full color images). This can improve compression ratios, reduce data size and improve image quality. The present embodiments have numerous applications, for example, in systems and/or situations where data bandwidth and/or storage capacity is limited and/or critical. Some embodiments can be applied to a high resolution camera mounted on an aircraft (typically within protective enclosure, such as a sensor ball or the like) that can take multiple images a second such that large amounts of data are being delivered from the camera. In some instances such a camera can generate 700 or more megabits of data per second. Following the color condensing and compression provided by the present embodiments, the amount of data to be stored and/or transmitted is significantly reduced, sometimes down to ten percent or less (e.g., reducing the 700 megabits per second to compressed 70 megabits per second that are locally stored, and/or communicated from the aircraft).

While the invention herein disclosed has been described by means of specific embodiments and applications thereof, numerous modifications and variations could be made thereto by those skilled in the art without departing from the scope of the invention set forth in the claims.

What is claimed is:

1. A method for use in image transformation, comprising:
receiving digital image data comprising a plurality of pixel data;
separating the plurality of pixel data of the digital image data according to color components;
condensing the digital image data having been separated to define a plurality of condensed pixel data each corresponding with a color component;
cooperating the condensed pixel data defining representative image data; and
transforming the representative image data.

2. The method of claim 1, wherein the cooperating the condensed pixel data comprises defining the representative image data such that the representative image data comprises a plurality of regions with each region comprising one of the plurality of cooperated pixel data.

3. The method of claim 2, wherein the plurality of regions comprise quadrants of the representative image data.

4. The method of claim 3, wherein each quadrant is associated with a color component.

5. The method of claim 3, wherein two of the quadrants are associated with a same color component.

6. A method for use in image transformation, comprising:
receiving digital image data comprising a plurality of pixel data;
separating the plurality of pixel data of the digital image data according to color components;
condensing the digital image data having been separated to define a plurality of condensed pixel data each corresponding with a color component;

cooperating the condensed pixel data defining representative image data; and
transforming the representative image data
wherein the separating the pixel data comprises:
- buffering pixel data associated with a first color component in a first buffer;
- buffering pixel data associated with a second color component in a second buffer;
- buffering pixel data associated with a third color component in a third buffer; and
- generating a cooperated image data comprising a plurality of regions with each corresponding with a color component.

7. The method of claim 6, wherein the generating the cooperated image data comprises:
- retrieving the pixel data associated with the first color component representing a first quadrant of the concatenated image data;
- retrieving the pixel data associated with the second color component representing a second quadrant of the concatenated image data; and
- retrieving the pixel data associated with the third color component representing a third quadrant of the concatenated image data.

8. The method of claim 7, wherein the generating the cooperated image data further comprises retrieving the pixel data associated with the first color component representing a fourth quadrant of the concatenated image.

9. A method for use in transforming digital data, comprising:
- receiving image data comprising a plurality of pixel data;
- reducing variations between neighboring pixel data of the plurality of pixel data producing reduced variation pixel data comprising parsing the pixel data according to color components;
- defining representative image data comprising the reduced variation of pixel data, the representative image data comprising condensed sets of pixel data having been parsed, each condensed set corresponding to a respective color component; and
- transforming the representative image data.

10. The method of claim 9, wherein the reducing variations between neighboring pixel data comprises rearranging at least some of the plurality of pixel data defining the representative image.

11. The method of claim 10, wherein the rearranging comprises:
- defining a plurality of regions of the representative image data where each region comprises a collection of pixel data collected according to the representative color component of the pixel data.

12. The method of claim 9, wherein the reducing the variation comprises condensing the pixel data into a plurality of condensed pixel data condensed according to a color component of each pixel data defining the reduced variation pixel data.

13. The method of claim 9, wherein the defining representative image data comprises defining a plurality of tiles of the representative image data, each tile comprising one of the plurality of condensed pixel data for the respective color component.

14. An apparatus for use in transforming digital data, comprising:
- a parser to receive a plurality of pixel data representative of a digital image and separate the pixel data according to a color component;
- a memory coupled with the parser to receive the separated pixel data;
- a condenser coupled with the memory to condense the pixel data according to the color components of each pixel data producing condensed pixel data defining a condensed representation of the pixel data; and
- a transformer coupled with the condenser to receive the condensed pixel data and to transform the condensed pixel data.

15. The apparatus of claim 14, wherein the condenser reduces variation between neighboring pixel data of the digital image.

16. The apparatus of claim 15, wherein the condenser rearranges the plurality of pixel data according to the color components of each pixel data.

17. The apparatus of claim 15, wherein the transformer performs a wavelet compression to compress the condensed pixel data.

18. The apparatus of claim 14, wherein the condenser condenses the pixel data into tiles defining quadrants of the representative condensed image.

* * * * *